US010992189B2

(12) United States Patent
Wang et al.

(10) Patent No.: US 10,992,189 B2
(45) Date of Patent: Apr. 27, 2021

(54) METHOD FOR WIRELESS CHARGING, TRANSMITTER, RECEIVER AND POWER MANAGEMENT APPARATUS

(71) Applicant: BEIJING XIAOMI MOBILE SOFTWARE CO., LTD., Beijing (CN)

(72) Inventors: Yanteng Wang, Beijing (CN); Zhijie Li, Beijing (CN); Hongtu Cui, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 334 days.

(21) Appl. No.: 16/113,348

(22) Filed: Aug. 27, 2018

(65) Prior Publication Data

US 2019/0068005 A1 Feb. 28, 2019

(30) Foreign Application Priority Data

Aug. 29, 2017 (CN) .......................... 201710756020.5

(51) Int. Cl.
*H02J 50/80* (2016.01)
*H02J 50/10* (2016.01)
(Continued)

(52) U.S. Cl.
CPC .............. *H02J 50/80* (2016.02); *H02J 7/025* (2013.01); *H02J 50/10* (2016.02); *H04B 5/0037* (2013.01)

(58) Field of Classification Search
CPC ..................................................... H02J 50/80
(Continued)

(56) References Cited

U.S. PATENT DOCUMENTS 9,728,997 B2 * 8/2017 Kim ..................... H02J 7/025
2008/0197713 A1 * 8/2008 Jin ...................... H02J 50/60
307/104
(Continued)

FOREIGN PATENT DOCUMENTS

CN 103313002 A 9/2013
CN 103633692 A 3/2014
(Continued)

OTHER PUBLICATIONS

First Office Action issued to Chinese Patent Application No. 201710756020.5 dated Feb. 3, 2020 with English translation (27p).
(Continued)

*Primary Examiner* — Jerry D Robbins
(74) *Attorney, Agent, or Firm* — Arch & Lake LLP

(57) ABSTRACT

A method, a transmitter, a receiver, and a power management apparatus are provided for wireless charging. The method may include: acquiring, in response to an establishment of a connection from the wireless charging transmitter to a charger, voltage and current capability information of the charger; determining, in response to fast wireless charge identification information received from a wireless charging receiver, acknowledgment information corresponding to the fast wireless charge identification information according to the voltage and current capability information of the charger; sending the acknowledgment information to the wireless charging receiver; and requesting, in response to a charging request including desired voltage information and desired current information received from the wireless charging receiver, the charger for a voltage and a current corresponding to the desired voltage information and the desired current information, respectively.

16 Claims, 6 Drawing Sheets

(51) Int. Cl.
*H02J 7/02* (2016.01)
*H04B 5/00* (2006.01)

(58) Field of Classification Search
USPC ........................................................ 320/108
See application file for complete search history.

(56) References Cited

U.S. PATENT DOCUMENTS

| | | | |
|---|---|---|---|
| 2010/0073128 | A1 | 3/2010 | Talwerdi |
| 2010/0308108 | A1 | 12/2010 | Choi et al. |
| 2011/0133892 | A1 | 6/2011 | Nohr |
| 2014/0241555 | A1 | 8/2014 | Terlizzi |
| 2014/0306646 | A1 | 10/2014 | Liu et al. |
| 2016/0372963 | A1 | 12/2016 | Sankar |
| 2018/0191190 | A1* | 7/2018 | Chu ................. H02J 50/10 |
| 2019/0020210 | A1* | 1/2019 | Partovi ............ B60L 53/126 |

FOREIGN PATENT DOCUMENTS

| | | | |
|---|---|---|---|
| CN | 104616636 | A | 5/2015 |
| CN | 105337353 | A | 2/2016 |
| CN | 105826623 | A | 8/2016 |
| CN | 106786899 | A | 5/2017 |
| CN | 106786905 | A | 5/2017 |
| CN | 107332590 | A | 11/2017 |
| EP | 1131769 | B1 | 2/2005 |
| EP | 2728705 | A2 | 5/2014 |
| EP | 3068017 | A2 | 9/2016 |
| EP | 3136545 | A1 | 3/2017 |
| JP | H035935 | A | 1/1991 |
| JP | 2010035273 | A | 2/2010 |
| JP | 2014155281 | A | 8/2014 |
| KR | 20120082500 | A | 7/2012 |
| KR | 20160110023 | A | 9/2016 |
| RU | 2596613 | C2 | 9/2016 |
| RU | 2621682 | C1 | 6/2017 |
| WO | 2014167171 | A1 | 10/2014 |
| WO | 2014180840 | A1 | 11/2014 |
| WO | 2017111859 | A1 | 6/2017 |

OTHER PUBLICATIONS

Office Action Decision of Refusal to Japanese Patent Application No. 2018-514411, dated Dec. 26, 2019, (4p).
Extended Search Report in corresponding European Application No. 18191146.2, dated Jan. 25, 2019, 10 pages.
Acceptance Decision issued in corresponding Russian Application No. 2018132615/07(053377), dated May 7, 2019, 20 pages.
European Office Action issued in EP18191146.2, dated Apr. 14, 2020, 8 pages.
Korean Office Action (including English translation) issued in KR20187027411 dated May 15, 2020, 11 pages.
International Search Report issued in corresponding International Application No. PCT/CN2018/072542, dated May 24, 2018, 5 pages.
Second Office Action issued to Chinese Patent Application No. 201711265201.4 dated Dec. 31, 2019 and English translation, (14p).
First Office Action issued to Chinese Patent Application No. 201710756020.5 dated Feb. 3, 2020 and English translation (27p).
International search report (including English translation) issued in corresponding International Application No. PCT/CN2018/072542 dated May 24, 2018, 4 pages.

* cited by examiner

METHOD FOR WIRELESS CHARGING, TRANSMITTER, RECEIVER AND POWER MANAGEMENT APPARATUS

CROSS-REFERENCE TO RELATED APPLICATIONS

This application is based upon and claims priority to Chinese Patent Application No. 201710756020.5, filed Aug. 29, 2017, the entire contents of which are incorporated herein by reference.

TECHNICAL FIELD

The present disclosure relates to the field of charging technologies, and in particular, to a method for wireless charging, a transmitter, a receiver, and a power management apparatus.

BACKGROUND

Wireless charging technologies, especially wireless charging technologies of Wireless Power Consortium (WPC), are increasingly used in mobile terminals. For example, wearable devices have widely used the wireless charging technologies, and some phones also use the WPC wireless charging technology for charging. The USB PD (Universal Serial Bus Power Delivery) protocol is a protocol standardized by the USB Association to support more powerful charging. With the USB PD protocol and the Type C interface increasingly used in the mobile terminals, the chargers supporting the USB PD also become more and more popular.

In the related art, some wireless charging technologies support a charger with a Dedicated Charge Port (DCP). In such case, the wireless charging transmitter and the charger need to perform a Battery Charging Specification 1.2 (BC1.2) protocol detection, and the input voltage supported by BC1.2 is only 5V. When using the voltage of 5V for charging, the charging power is limited. Some of the other wireless charging technologies support fixed voltage inputs, such as 9V or 12V. There are also some wireless charging technologies in which an encrypted authentication is performed between the wireless charging receiver (Rx) and the wireless charging transmitter, and fast wireless charging starts if the encryption authentication is passed. However, a large number of chargers on the market do not support the method of using a fixed voltage or using an encryption.

SUMMARY

The present disclosure provides a method for wireless charging, a transmitter, a receiver, and a power management apparatus.

According to a first aspect of the present disclosure, there is provided a method for wireless charging. The method is applied to a wireless charging transmitter, and includes: when detecting that a connection is established between the wireless charging transmitter and a charger, acquiring voltage and current capability information of the charger; when receiving fast wireless charge identification information from a wireless charging receiver, determining acknowledgment information corresponding to the fast wireless charge identification information according to the voltage and current capability information of the charger; sending the acknowledgment information to the wireless charging receiver; and, when receiving a charging request including desired voltage information and desired current information from the wireless charging receiver, requesting the charger for a voltage and a current respectively corresponding to the desired voltage information and the desired current information.

According to a second aspect of the present disclosure, there is provided a method for wireless charging. The method is applied to a wireless charging receiver, and includes: forwarding, in response to fast wireless charge identification information received from a power management apparatus, the fast wireless charge identification information to a wireless charging transmitter; forwarding, in response to acknowledgment information received from the wireless charging transmitter in response to the fast wireless charge identification information, the acknowledgment information to the power management apparatus; and forwarding, in response to a charging request received from the power management apparatus in response to the acknowledgment information, the charging request to the wireless charging transmitter.

According to a third aspect of the present disclosure, there is provided a method for wireless charging. The method is applied to a power management apparatus, and includes: sending, in response to detecting a first voltage input, fast wireless charge identification information to a wireless charging receiver; determining a charging request based on acknowledgment information received from the wireless charging receiver, wherein the acknowledgment information is generated by the wireless charging receiver in response to the fast wireless charge identification information; sending the charging request to the wireless charging receiver; and setting an input current of the power management apparatus according to the charging request and a charging efficiency.

According to a fourth aspect of the present disclosure, there is provided a wireless charging transmitter. The wireless charging transmitter may include: an acquisition module, a first determining module, a first sending module, and a first requesting module. The acquisition module is configured to, in response to an establishment of a connection from the wireless charging transmitter to a charger, acquire voltage and current capability information of the charger. The first determining module is configured to, in response to fast wireless charge identification information received from a wireless charging receiver, determine acknowledgment information corresponding to the fast wireless charge identification information according to the voltage and current capability information of the charger. The first sending module is configured to send the acknowledgment information to the wireless charging receiver. The first requesting module is configured to, in response to a charging request received from the wireless charging receiver in response to the acknowledgment information, request the charger for a voltage and a current corresponding to the charging request.

According to a fifth aspect of the present disclosure, there is provided a wireless charging receiver. The wireless charging receiver may include: a first forwarding module, a second forwarding module, and a third forwarding module. The first forwarding module is configured to, in response to fast wireless charge identification information received from a power management apparatus, forward the fast wireless charge identification information to a wireless charging transmitter. The second forwarding module is configured to, in response to acknowledgment information received from the wireless charging transmitter in response to the fast wireless charge identification information, forward the acknowledgment information to the power management apparatus. The third forwarding module is configured to, in response to a charging request received from the power management apparatus in response to the acknowledgment information, forward the charging request to the wireless charging transmitter.

According to a sixth aspect of the present disclosure, there is provided a power management apparatus, including: a second sending module configured to, in response to detecting a first voltage input, send fast wireless charge identification information to a wireless charging receiver; a second determining module configured to determine a charging request based on acknowledgment information received from the wireless charging receiver, wherein the acknowledgment information is generated by the wireless charging receiver in response to the fast wireless charge identification information; a third sending module configured to send the charging request to the wireless charging receiver; and a setting module configured to set an input current of the power management apparatus according to the charging request and a charging efficiency.

According to a seventh aspect of the present disclosure, there is provided a wireless charging transmitter, including: a processor; and a memory for storing instructions executable by the processor, wherein the processor is configured to perform the steps in the method for wireless charging according to the first aspect.

According to an eighth aspect of the present disclosure, there is provided a wireless charging receiver, including: a processor; and a memory for storing instructions executable by the processor, wherein the processor is configured to perform the steps in the method for wireless charging according to the second aspect.

According to a ninth aspect of the present disclosure, there is provided a power management apparatus, including: a processor; and a memory for storing instructions executable by the processor, wherein the processor is configured to perform the steps in the method for wireless charging according to the second aspect.

According to a tenth aspect of the present disclosure, there is provided a computer-readable storage medium having stored thereon a computer program, wherein the computer program, when executed by a processor, carries out the steps in the method for wireless charging according to the first aspect.

According to an eleventh aspect of the present disclosure, there is provided a computer-readable storage medium having stored thereon a computer program, wherein the computer program, when executed by a processor, carries out the steps in the method for wireless charging according to the second aspect.

According to a twelfth aspect of the present disclosure, there is provided a computer-readable storage medium having stored thereon a computer program, wherein the computer program, when executed by a processor, carries out the steps in the method for wireless charging according to the third aspect.

According to a thirteenth aspect of the present disclosure, there is provided a wireless charging system, where the wireless charging system includes a wireless charging transmitter and a power management apparatus.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims. In this disclosure, the term "in response to a condition" may mean when a condition is met.

Figure 1:
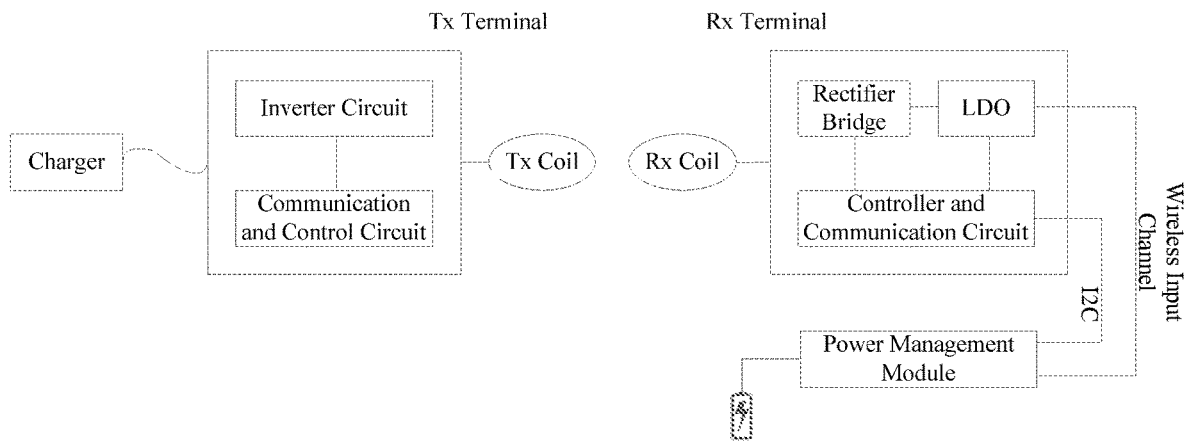
FIG. 1 is a schematic diagram of a wireless charging system according to an aspect of the disclosure.

FIG. 1 is a schematic diagram of a wireless charging system according to an aspect of the disclosure. As shown in FIG. 1, the wireless charging system includes: a charger, a wireless charging transmitter (Tx terminal), a wireless charging receiver (Rx terminal), and a power management apparatus. The charger may be a PD charger that supports the USB PD protocol. The charger and the wireless charging transmitter may be connected using a C to C cable. The wireless charging transmitter may include an inverter circuit, a communication and control circuit, and a Tx coil. The inverter circuit may be a half-bridge inverter circuit or a full-bridge inverter circuit. The inverter circuit may be used to convert a direct current to an alternating current. The communication and control circuit may be used to control the inverter circuit, and may also be used to complete the PD communication with the charger. In addition, the communication and control circuit may be used to perform FSK (Frequency Shift Keying) modulation on the wireless transmission signal, and may demodulate ASK (Amplitude Shift Keying) signal which is inputted by coupling of the Tx coil. The Tx coil may be used to generate a magnetic induction with a Rx coil of the wireless charging receiver, and send and receive wireless signals. The wireless charging receiver may include the Rx coil, a rectifier bridge, an LDO (Low Dropout Regulator), and a controller and communication circuit. Among them, the Rx coil may be used to generate a magnetic induction with the Tx coil, and send and receive the wireless signals. The rectifier bridge may be used to convert the alternating current to the direct current. The LDO may be used to output a stable voltage. An output terminal of the LDO is connected to a wireless input channel of the power management apparatus. The controller and communication circuit may be used to control the rectifier bridge, and may be used to perform ASK modulation on the wireless transmission signal and perform demodulation on the FSK signal which is inputted by coupling of the Rx coil, and may also be used to communicate with the power management apparatus. The power management apparatus may be used to receive a wireless input of the wireless charging receiver, charge the battery, and may also be used to perform I2C (Inter-Integrated Circuit) communication with the wireless charging receiver. The power management apparatus may be a power management chip, and may include a power management chip and a peripheral circuit, which are not limited herein. The method for wireless charging of the wireless charging system will be described in detail below, and details are not described herein again.

Figure 2:
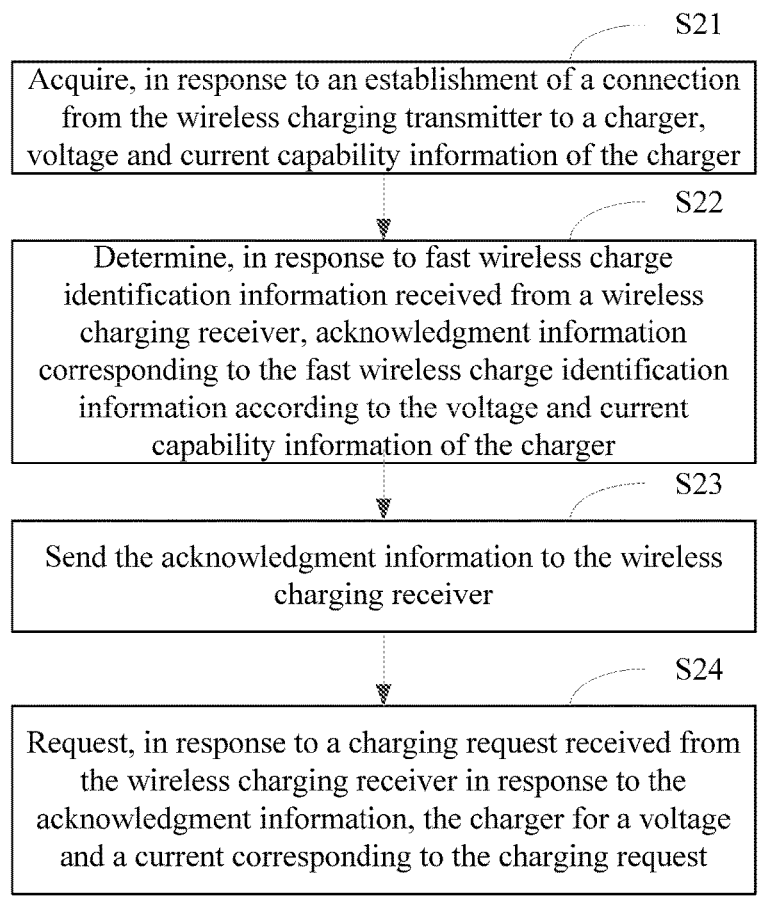
FIG. 2 is a flowchart of a method for wireless charging according to an aspect of the disclosure.

FIG. 2 is a flowchart of a method for wireless charging according to an aspect of the disclosure. The method is applied to a wireless charging transmitter. As shown in FIG. 2, the method includes steps S21 to S24.

In step S21, in response to an establishment of a connection from the wireless charging transmitter to a charger, voltage and current capability information of the charger is acquired. For example, when detecting that a connection is established between the wireless charging transmitter and a charger, the wireless charging transmitter acquires voltage and current capability information of the charger in a handshake message.

The charger may be a PD charger. The wireless charging transmitter may be connected to the charger via a Type C cable.

In this embodiment, after the connection between the wireless charging transmitter and the charger is established, the charger may send voltage and current capability (Source Capability) information of the charger to the wireless charging transmitter, and the wireless charging transmitter may receive the voltage and current capability information of the charger from the charger. The voltage and current capability information may include fixed PDO (Power Data Object) information and APDO (Augmented Power Data Object) information. For example, the fixed PDO information may be 5V/3 A, 9V/2 A, 12V/1.5 A, or the like. The APDO information may represent programmable voltage and current information, such as 3-5.9V/3 A and so on.

In a possible implementation manner, after acquiring the voltage and current capability information of the charger, the wireless charging transmitter may record the voltage and current capability information of the charger.

In this embodiment, the wireless charging transmitter may determine the voltage and current capability of the charger according to the voltage and current capability information of the charger. For example, the wireless charging transmitter may determine whether the charger meets a requirement of fast wireless charging according to the voltage and current capability information of the charger and a voltage and current requirement corresponding to the requirement of fast wireless charging. If the charger meets the requirement of fast wireless charging, it indicates that the charger supports fast wireless charging; and if the charger does not meet the requirement of fast wireless charging, it indicates that the charger does not support the fast wireless charging.

In a possible implementation manner, the wireless charging transmitter may send, to the charger, reception acknowledgment information corresponding to the voltage and current capability information in response to the received voltage and current capability information. The reception acknowledgment information may be used to indicate that the wireless charging transmitter has successfully received the voltage and current capability information of the charger. For example, the reception acknowledgment information may be GoodCRC information.

In a possible implementation manner, the method further includes: requesting, by the wireless charging transmitter, a first voltage to the charger after the voltage and current capability information of the charger is acquired. For example, the first voltage may be 5V.

In step S22, in response to fast wireless charge identification information received from a wireless charging receiver, acknowledgment information corresponding to the fast wireless charge identification information is determined according to the voltage and current capability information of the charger. For example, when receiving fast wireless charge identification information from a wireless charging receiver, the wireless charging transmitter determines acknowledgment information corresponding to the fast wireless charge identification information according to the voltage and current capability information of the charger.

In a possible implementation manner, the wireless charging transmitter may receive fast wireless charge identification information from the Rx coil of the wireless charging receiver through the Tx coil. The fast wireless charge identification information received by the Tx coil is ASK-modulated fast wireless charge identification information. The wireless charging transmitter may demodulate the ASK-modulated fast wireless charge identification information through the communication and control circuit module.

The acknowledgment information may be fast wireless charge acknowledgment (Fast-charge-identification-ACK) information or normal wireless charge acknowledgment (Normal-charge-identification-ACK) information.

In a possible implementation manner, when the fast wireless charge identification information is received from the wireless charging receiver, the determination of the acknowledgment information corresponding to the fast wireless charge identification information according to the voltage and current capability information of the charger includes: demodulating, in response to fast wireless charge identification information received from the wireless charging receiver, the fast wireless charge identification information; if the fast wireless charge identification information is correctly demodulated and it is determined according to the voltage and current capability information of the charger that the charger satisfies a requirement of fast wireless charging, determining the acknowledgment information corresponding to the fast wireless charge identification information as fast wireless charge acknowledgment information; and if the fast wireless charge identification information is correctly demodulated and it is determined according to the voltage and current capability information of the charger that the charger does not satisfy the requirement of fast wireless charging, determining the acknowledgment information corresponding to the fast wireless charge identification information as normal wireless charge acknowledgment information.

In a possible implementation manner, when the acknowledgment information is the fast wireless charge acknowledgment information, the acknowledgment information may include the voltage and current capability information of the charger.

In step S23, the acknowledgment information is sent to the wireless charging receiver.

In step S24, in response to a charging request received from the wireless charging receiver in response to the acknowledgment information, the charger is requested for a voltage and a current corresponding to the charging request. That is, in step S24, in response to a charging request including desired voltage information and desired current information received from the wireless charging receiver, the charger is requested for a voltage and a current corresponding to the desired voltage information and the desired current information, respectively. For example, when receiving a charging request from the wireless charging receiver in response to the acknowledgment information, the wireless charging transmitter sends a request to the charger to request the charger to output a voltage and a current corresponding to the charging request.

The charging request may be a fast wireless charging request or a normal wireless charging request. When the charging request is the normal wireless charging request, the wireless charging system may operate in the normal wireless charging mode, and the charging voltage of the normal wireless charging mode may be 5V.

For example, if the charging request is a fast wireless charging request and the voltage and the current corresponding to the charging request are 9V/2 A, the wireless charging transmitter requests the voltage and current of 9V/2 A from the charger to instruct the charger to output the voltage and current of 9V/2 A. The charger responds to the charging request of the wireless charging transmitter and outputs the voltage and current of 9V/2 A. After the input voltage of the wireless charging transmitter is adjusted, the voltage rectified and outputted by the wireless charging receiver increases accordingly.

In a possible implementation manner, if the wireless charging transmitter cannot correctly demodulate the fast wireless charge identification information, the wireless charging transmitter does not send the acknowledgment information to the wireless charging receiver.

In this embodiment, when detecting that a connection is established with the charger, the wireless charging transmitter acquires the voltage and current capability information of the charger; when the fast wireless charge identification information from the wireless charging receiver is received, the wireless charging transmitter determines the acknowledgment information corresponding to the fast wireless charge identification information according to the voltage and current capability information of the charger, sends the acknowledgment information to the wireless charging receiver, and when the charging request sent by the wireless charging receiver in response to the acknowledgment information is received, the wireless charging transmitter requests a voltage and a current corresponding to the charging request from the charger. In this way, the wireless charging process is optimized, and the flexibility of wireless charging is improved. In this embodiment, the wireless charging transmitter may perform a PD communication with the PD charger, and the wireless charging transmitter may further communicate with the PD charger according to the charging request of the power management apparatus, thereby enabling the PD communication between the mobile terminal and the wireless charging transmitter so as to perform an operation of increasing voltage and current, and thereby increasing the charging power.

Figure 3:
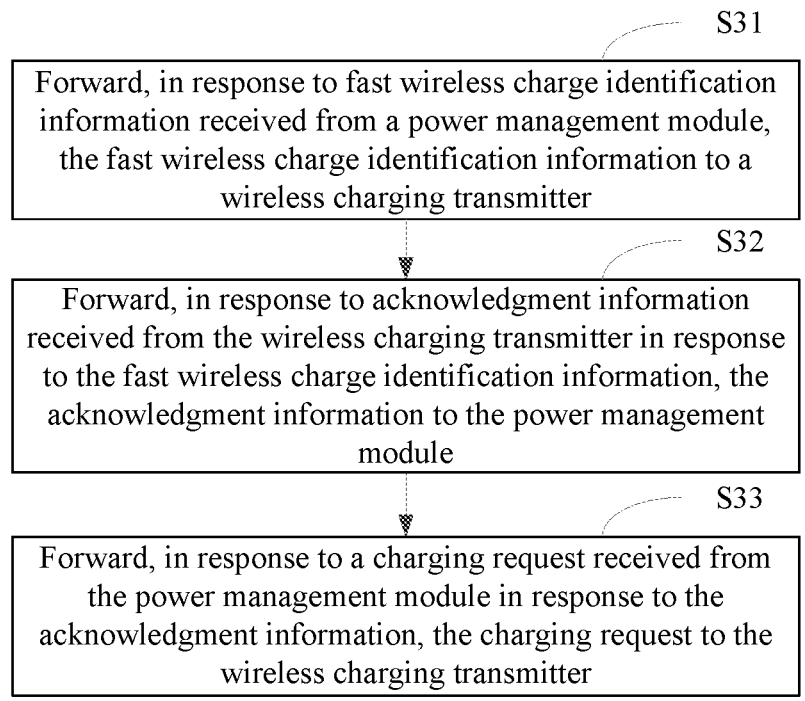
FIG. 3 is a flowchart of a method for wireless charging according to another aspect of the disclosure.

FIG. 3 is a flowchart illustrating a method for wireless charging according to another aspect of the disclosure. The method is applied to a wireless charging receiver. As shown in FIG. 3, the method includes steps S31 to S33.

In step S31, in response to fast wireless charge identification information received from a power management apparatus, the fast wireless charge identification information is forwarded to a wireless charging transmitter.

In a possible implementation manner, when the wireless charging receiver receives the fast wireless charge identification information from the power management apparatus, the fast wireless charge identification information may be ASK-modulated by the controller and communication circuit module, and the modulated fast wireless charge identification information is transmitted to the Tx coil of the wireless charging transmitter via the Rx coil.

In step S32, in response to acknowledgment information received from the wireless charging transmitter in response to the fast wireless charge identification information, the acknowledgment information is forwarded to the power management apparatus.

In a possible implementation manner, if the wireless charging receiver receives the acknowledgment information sent by the wireless charging transmitter in response to the fast wireless charge identification information within a first time period after forwarding the fast wireless charge identification information to the wireless charging transmitter, the acknowledgment information may be fed back to the power management apparatus via I2C. If the wireless charging receiver does not receive the acknowledgment information sent by the wireless charging transmitter in response to the fast wireless charge identification information within the first time period after forwarding the fast wireless charge identification information to the wireless charging transmitter, it may be determined that the wireless charging transmitter does not support the fast wireless charging.

In step S33, in response to a charging request received from the power management apparatus in response to the acknowledgment information, the charging request is forwarded to the wireless charging transmitter.

In a possible implementation manner, when the acknowledgment information is fast wireless charge acknowledgment information, the charging request is a fast wireless charging request; and when the acknowledgment information is normal wireless charge acknowledgment information, the charging request is a normal wireless charging request.

In a possible implementation manner, the method further includes: outputting, in response to detecting an establishment of a connection from the wireless charging receiver to the wireless charging transmitter, a first voltage to the power management apparatus. For example, when the Rx terminal is placed on the Tx terminal, through the magnetic induction between the Rx coil and the Tx coil, it may be determined that the connection between the wireless charging receiver and the wireless charging transmitter is established. The wireless charging receiver may rectify and then output the first voltage to the wireless input channel of the power management apparatus. The first voltage may be 5V.

In this embodiment, when receiving the fast wireless charge identification information from the power management apparatus, the wireless charging receiver forwards the fast wireless charge identification information to the wireless charging transmitter; when receiving acknowledgment information sent by the wireless charging transmitter in response to the fast wireless charge identification information, the wireless charging receiver forwards the acknowledgment information to the power management apparatus;

and when a charging request sent by the power management apparatus in response to the acknowledgment information is received, the wireless charging receiver forwards the charging request to the wireless charging transmitter. In this way, the wireless charging process is optimized, the flexibility of wireless charging is improved, and a PD communication between the mobile terminal and the wireless charging transmitter is enabled so as to perform the operation of boosting voltage and current, thereby increasing the charging power.

Figure 4:
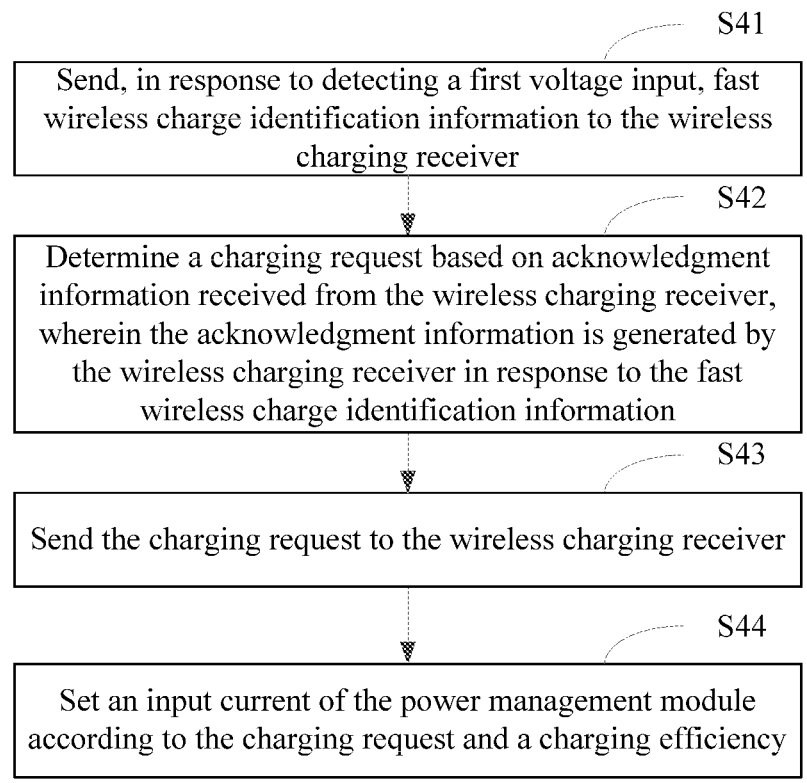
FIG. 4 is a flowchart of a method for wireless charging according to another aspect of the disclosure.

FIG. 4 is a flowchart of a method for wireless charging according to another aspect of the disclosure. The method is applied to a power management apparatus, and the power management apparatus may be placed in a mobile terminal. As shown in FIG. 4, the method includes steps S41 to S44.

In step S41, in response to detecting a first voltage input, fast wireless charge identification information is sent to the wireless charging receiver.

In this embodiment, when detecting that the first voltage exists in a wireless input channel, the power management apparatus may send fast wireless charge identification (fast-charge-identification) information to the wireless charging receiver to start the fast wireless charge identification process. The first voltage may be 5V.

In a possible implementation manner, the power management apparatus may communicate with the wireless charging receiver through the I2C and send the fast wireless charge identification information to the wireless charging receiver.

As an example of this implementation manner, the power management apparatus may communicate with the controller and communication circuit module of the wireless charging receiver via the I2C, and send the fast wireless charge identification information to the controller and communication circuit module of the wireless charging receiver.

In step S42, a charging request is determined based on acknowledgment information received from the wireless charging receiver, wherein the acknowledgment information is generated by the wireless charging receiver in response to the fast wireless charge identification information.

In a possible implementation manner, the determining the charging request according to the acknowledgment information includes: if the acknowledgment information is fast wireless charge acknowledgment information, determining the charging request as a fast wireless charging request; and if the acknowledgment information is normal wireless charge acknowledgment information, determining the charging request as a normal wireless charging request. In this implementation manner, if the acknowledgment information received by the power management apparatus is the fast wireless charge acknowledgment information, the fast wireless charging (fast-charge-on) request may be determined according to the voltage and current capability information of the charger carried in the acknowledgment information. The fast wireless charging request includes voltage and current information required for charging. For example, the voltage and current information required for charging is 9V/2 A. If the acknowledgment information received by the power management apparatus is the normal wireless charge acknowledgment information, it may be determined that the charging request is a normal wireless charging (normal-charge-on) request.

In step S43, the charging request is sent to the wireless charging receiver.

In step S44, an input current of the power management apparatus is set according to the charging request and a charging efficiency.

For example, the voltage and current corresponding to the charging request are 9V/2 A. The power management apparatus may set the current of the wireless input of the power management apparatus to be 1.5 A according to the current corresponding to the charging request and the charging efficiency.

In a possible implementation manner, when receiving the acknowledgment information sent by the wireless charging receiver in response to the fast wireless charge identification information, the determining the charging request based on acknowledgment information received from the wireless charging receiver includes: determining the charging request based on the acknowledgment information received from the wireless charging receiver if the acknowledgment information is received within a first time period after sending the fast wireless charging identification information.

In a possible implementation manner, after sending the fast wireless charge identification information to the wireless charging receiver, the method further includes: determining the charging request as a normal wireless charging request if the acknowledgment information is not received within a first time period after sending the fast wireless charging identification information.

In this embodiment, when the first voltage input is detected by the power management apparatus, the power management apparatus sends the fast wireless charge identification information to the wireless charging receiver; when receiving the acknowledgment information sent by the wireless charging receiver in response to the fast wireless charge identification information, the power management apparatus determines a charging request according to the acknowledgment information, sends the charging request to the wireless charging receiver, and sets the input current of the power management apparatus according to the charging request and the charging efficiency, thereby optimizing the wireless charging process and improving the flexibility of wireless charging, and enabling PD communication between the mobile terminal and the wireless charging transmitter so as to perform the operation of boosting voltage and current, thereby increasing the charging power.

Figure 5:
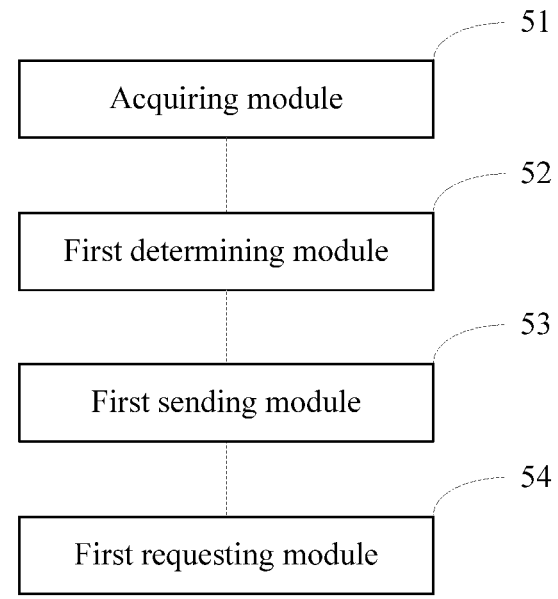
FIG. 5 is a block diagram of a wireless charging transmitter according to an aspect of the disclosure.

FIG. 5 is a block diagram of a wireless charging transmitter according to an aspect of the disclosure. As shown in FIG. 5, the wireless charging transmitter includes: an acquiring module 51, a first determining module 52, a first sending module 53, and a first requesting module 54.

The acquiring module 51 is configured to, in response to an establishment of a connection from the wireless charging transmitter to a charger, acquire voltage and current capability information of the charger.

The first determination module 52 is configured to, in response to fast wireless charge identification information received from a wireless charging receiver, determine acknowledgment information corresponding to the fast wireless charge identification information according to the voltage and current capability information of the charger.

The first sending module 53 is configured to send the acknowledgment information to the wireless charging receiver.

The first requesting module 54 is configured to, in response to a charging request received from the wireless charging receiver in response to the acknowledgment information, request the charger for a voltage and a current corresponding to the charging request. For example, the first requesting module 54 may request the charger to operate in a charging mode according to the voltage and a current corresponding to the charging request. The charging request may include the normal wireless charging request and a fast wireless charging request, where the two requests may require the charger to output different voltages and currents. Here, the first requesting module 54 may request the charger to enable the fast charging mode when the charging request received from the wireless charging receiver indicates that the fast charging mode is supported. When the charging request indicates that the fast charging mode is not supported, the first requesting module 54 may request the charger to maintain the normal charging mode. Additionally or alternatively, the first requesting module 54 may determine that the fast charging mode is not supported when no ACK signal is received during a preset time period.

Figure 6:
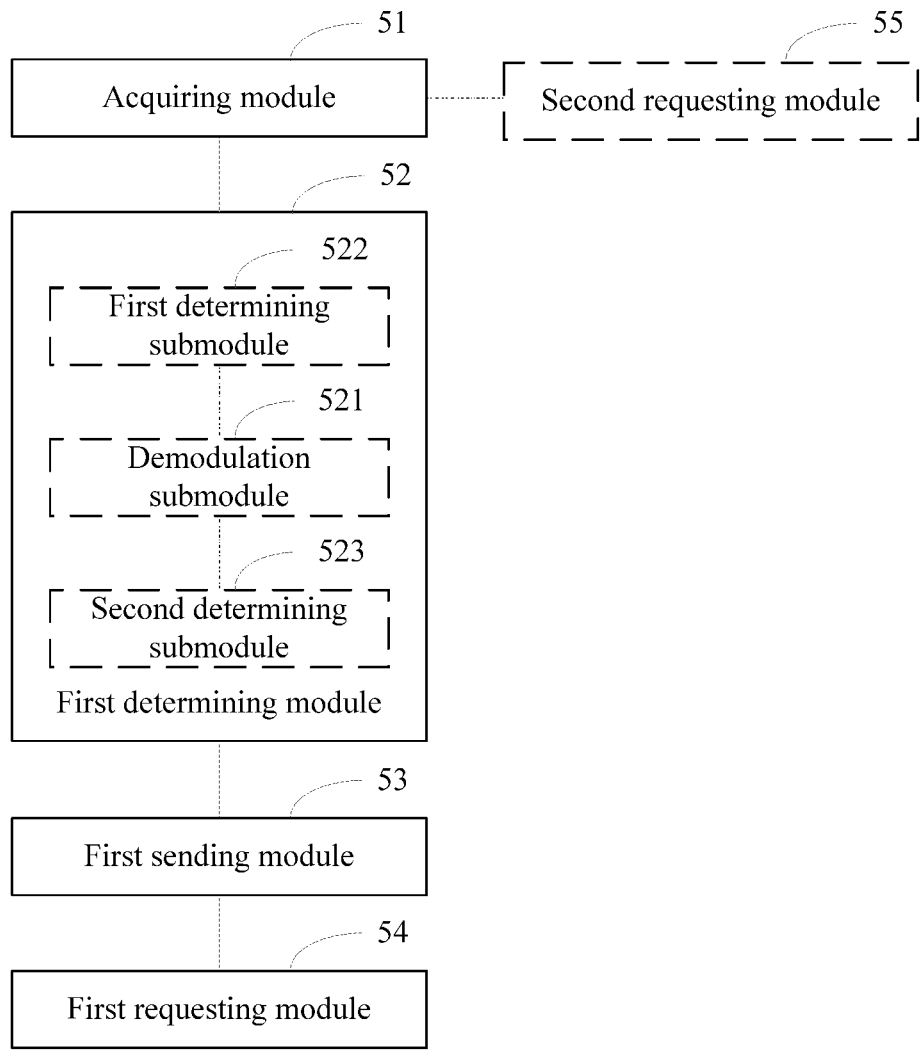
FIG. 6 is a block diagram of a wireless charging transmitter according to one example of an aspect of the disclosure.

FIG. 6 is a block diagram of a wireless charging transmitter according to one example of an aspect of the disclosure.

As shown in FIG. 6, in a possible implementation manner, the first determining module 52 includes a demodulation submodule 521, a first determining submodule 522, and a second determining submodule 523.

The demodulation submodule 521 is configured to, in response to fast wireless charge identification information received from the wireless charging receiver, demodulate the fast wireless charge identification information.

The first determining submodule 522 is configured to, if the fast wireless charge identification information is correctly demodulated the charger satisfies a requirement of fast wireless charging according to the voltage and current capability information of the charger, determine the acknowledgment information corresponding to the fast wireless charge identification information as fast wireless charge acknowledgment information.

The second determining submodule 523 is configured to, if the fast wireless charge identification information is correctly demodulated and the charger does not satisfy the requirement of fast wireless charging according to the voltage and current capability information of the charger, determine the acknowledgment information corresponding to the fast wireless charge identification information as normal wireless charge acknowledgment information.

In a possible implementation manner, the wireless charging transmitter further includes a second requesting module 55.

The second requesting module 55 is configured to request the charger for a first voltage.

With respect to the wireless charging transmitter in the foregoing embodiment, a specific manner in which each module performs operations has been described in detail in the embodiments related to the methods, which will not be elaborated herein.

In this embodiment, when the wireless charging transmitter detects that a connection is established with the charger, the voltage and current capability information of the charger is acquired; when receiving the fast wireless charge identification information from the wireless charging receiver, the wireless charging transmitter determines, according to the voltage and current capability information of the charger, acknowledgment information corresponding to the fast wireless charge identification information, and sends the acknowledgment information to the wireless charging receiver; and when receiving the charging request sent by the wireless charging receiver in response to the acknowledgment information, the wireless charging transmitter requests a voltage and a current corresponding to the charging request from the charger, thereby optimizing the wireless charging process, increasing the flexibility of wireless charging. In this embodiment, the wireless charging transmitter may perform PD communication with the PD charger, and the wireless charging transmitter may further communicate with the PD charger according to the charging request of the power management apparatus, thereby enabling the mobile terminal to perform PD communication with the wireless charging transmitter so as to carry out the boost up of the voltage and current, thereby increasing the charging power.

Figure 7:
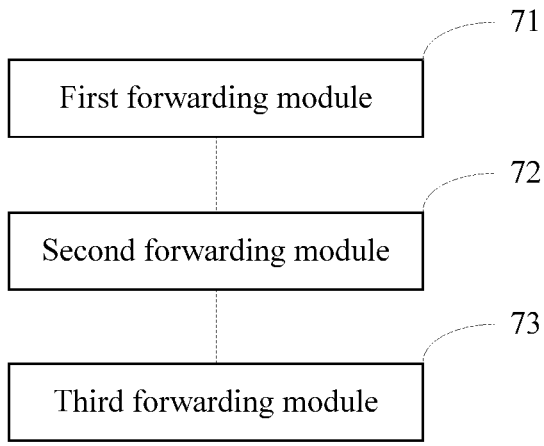
FIG. 7 is a block diagram of a wireless charging receiver according to an aspect of the disclosure.

FIG. 7 is a block diagram of a wireless charging receiver according to an aspect of the disclosure. As shown in FIG. 7, the wireless charging receiver includes a first forwarding module 71, a second forwarding module 72, and a third forwarding module 73.

The first forwarding module 71 is configured to, in response to fast wireless charge identification information received from a power management apparatus, forward the fast wireless charge identification information to a wireless charging transmitter.

The second forwarding module 72 is configured to, in response to acknowledgment information received from the wireless charging transmitter in response to the fast wireless charge identification information, forward the acknowledgment information to the power management apparatus.

The third forwarding module 73 is configured to, in response to a charging request received from the power management apparatus in response to the acknowledgment information, forward the charging request to the wireless charging transmitter.

In a possible implementation, when the acknowledgment information is fast wireless charge acknowledgment information, the charging request is a fast wireless charging request; and when the acknowledgment information is normal wireless charge acknowledgment information, the charging request is a normal wireless charging request.

Figure 8:
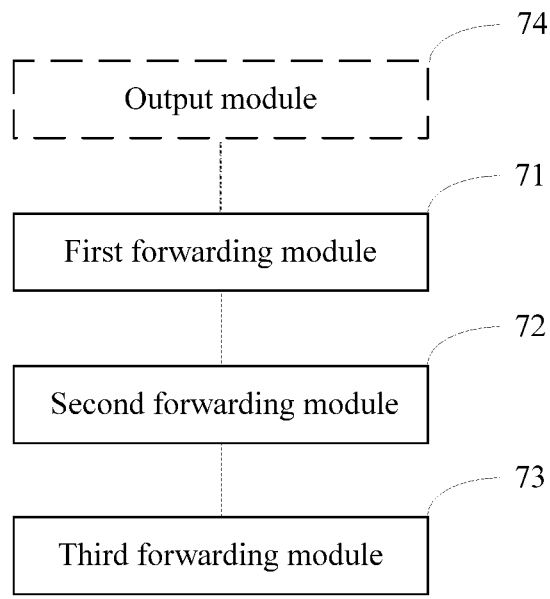
FIG. 8 is a block diagram of a wireless charging receiver according to one example of an aspect of the disclosure.

FIG. 8 is a block diagram of a wireless charging receiver according to one example of an aspect of the disclosure. As shown in FIG. 8, the wireless charging receiver further includes an output module 74.

The output module 74 is configured to, in response to an establishment of a connection from the wireless charging receiver to the wireless charging transmitter, output a first voltage to the power management apparatus.

With regard to the wireless charging receiver in the foregoing embodiment, a specific manner in which each module performs operations has been described in detail in the embodiments related to the methods, and a detailed description is not elaborated herein.

In this embodiment, when the wireless charging receiver receives the fast wireless charge identification information from the power management apparatus, it forwards the fast wireless charge identification information to the wireless charging transmitter; when receiving the acknowledgment information sent by the wireless charging transmitter in response to the fast wireless charge identification information, the wireless charging receiver forwards the acknowledgment information to the power management apparatus; and when receiving a charging request sent by the power management apparatus in response to the acknowledgment information, the wireless charging receiver forwards the charging request to the wireless charging transmitter, thereby optimizing the wireless charging process, improving the flexibility of wireless charging, enabling PD communication between the mobile terminal and the wireless charging transmitter so as to perform the operation of boosting the voltage and the current, thereby increasing the charging power.

Figure 9:
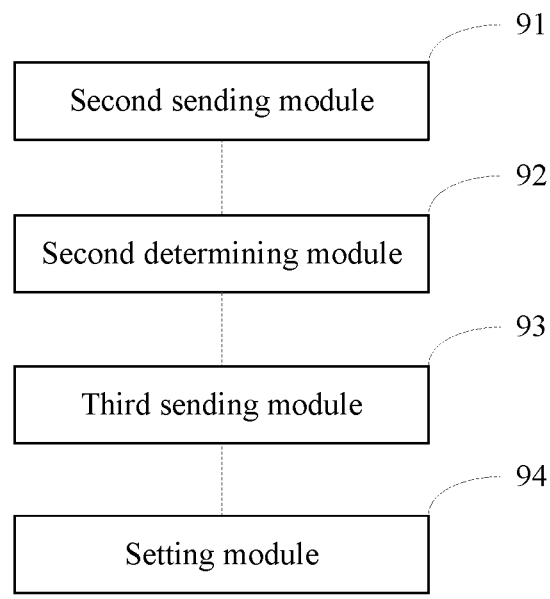
FIG. 9 is a block diagram of a power management apparatus according to an aspect of the disclosure.

FIG. 9 is a block diagram of a power management apparatus according to an aspect of the disclosure. As shown in FIG. 9, the power management apparatus includes: a second sending module 91, a second determining module 92, a third sending module 93 and a setting module 94.

The second sending module 91 is configured to, in response to detecting a first voltage input, send fast wireless charge identification information to a wireless charging receiver.

The second determination module 92 is configured to determine a charging request based on acknowledgment information received from the wireless charging receiver, wherein the acknowledgment information is generated by the wireless charging receiver in response to the fast wireless charge identification information.

The third sending module 93 is configured to send a charging request to the wireless charging receiver.

The setting module 94 is configured to set an input current of the power management apparatus according to the charging request and a charging efficiency.

In a possible implementation manner, the second determining module 92 is configured to, when the acknowledgment information sent by the wireless charging receiver in response to the fast wireless charge identification information is received within a first time period after sending the fast wireless charge identification information, determine the charging request according to the acknowledgment information.

Figure 10:
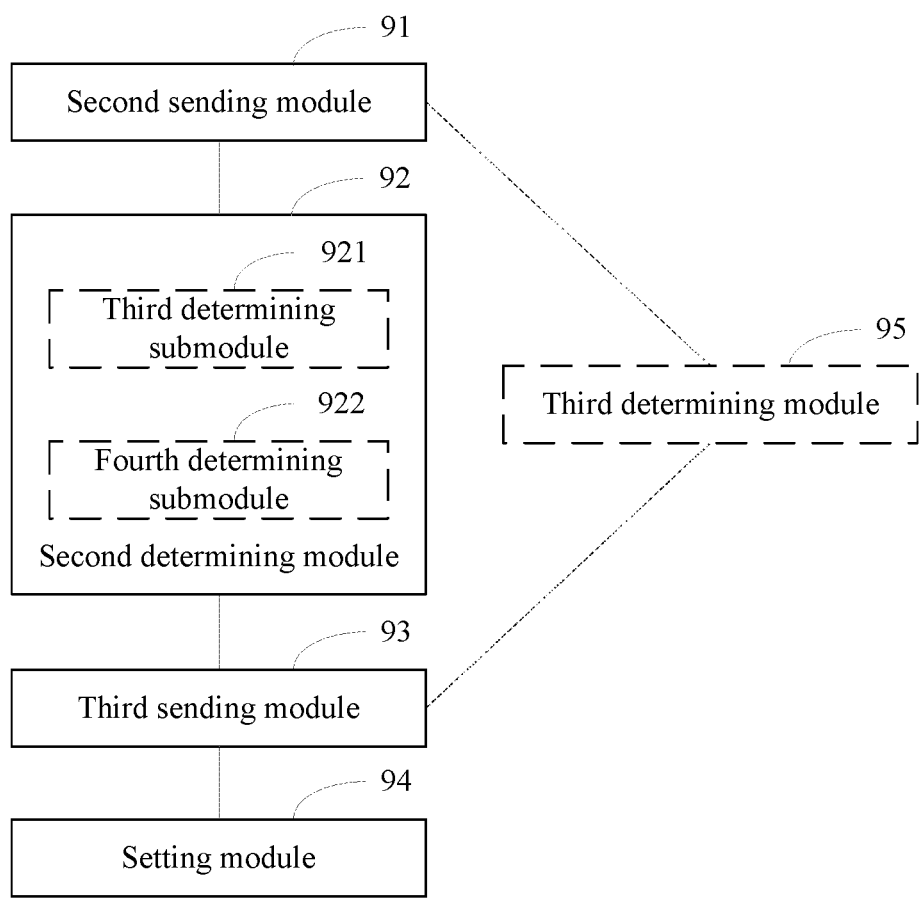
FIG. 10 is a block diagram of a power management apparatus according to one example of an aspect of the disclosure.

FIG. 10 is a block diagram of a power management apparatus according to an example of an aspect of the disclosure.

As shown in FIG. 10, in a possible implementation manner, the second determining module 92 includes: a third determining submodule 921 and a fourth determining submodule 922.

The third determining submodule 921 is configured to, if the acknowledgment information is fast wireless charge acknowledgment information, determine the charging request as a fast wireless charging request.

The fourth determining submodule 922 is configured to, if the acknowledgment information is normal wireless charge acknowledgment information, determine the charging request as a normal wireless charging request.

In a possible implementation manner, the power management apparatus further includes a third determining module 95.

The third determining module 95 is configured to determine the charging request as a normal wireless charging request if the acknowledgment information is not received within a first time period after sending the fast wireless charge identification information.

With respect to the power management apparatus in the foregoing embodiment, a specific manner in which each module performs operations has been described in detail in the embodiments related to the methods, which will not be elaborated herein. Each module or submodule in the disclosure may be implemented at least partially by integrated circuits and other hardware components.

In this embodiment, when the first voltage input is detected by the power management apparatus, the power management apparatus sends the fast wireless charge identification information to the wireless charging receiver; when receiving the acknowledgment information sent by the wireless charging receiver in response to the fast wireless charge identification information, the power management apparatus determines a charging request according to the acknowledgment information, sends the charging request to the wireless charging receiver, and sets the input current of the power management apparatus according to the charging request and the charging efficiency. In this way, the wireless charging process is optimized and the flexibility of wireless charging is improved. Meanwhile, the PD communication between the mobile terminal and the wireless charging transmitter is enabled so as to perform the operation of increasing voltage and current, thereby increasing the charging power.

In an aspect of the disclosure, there is also provided a computer-readable storage medium having stored thereon a computer program, which when executed by a processor, may implement the aforementioned method for wireless charging. The computer readable storage medium may include a random access memory (RAM), a read-only memory (ROM), an electrically erasable programmable read-only memory (EEPROM), a flash memory or other memories, a CDROM, a digital versatile disk or other optical or holographic media, magnetic cassettes, a magnetic tape, a magnetic disk storage or other data processing systems or magnetic storage devices which can be accessed by a computing device and may be used for encoded information.

Other embodiments of the disclosure may be apparent to those skilled in the art from consideration of the specification and practice of the disclosure disclosed here. This application is intended to cover any variations, uses, or adoptions of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for wireless charging, the method being applied to a wireless charging transmitter, comprising:
   when detecting that a connection is established between the wireless charging transmitter and a charger, acquiring, by the wireless charging transmitter, voltage and current capability information of the charger;
   when receiving fast wireless charge identification information from a wireless charging receiver, determining acknowledgment information corresponding to the fast wireless charge identification information according to the voltage and current capability information of the charger;
   sending, by the wireless charging transmitter, the acknowledgment information to the wireless charging receiver; and
   when receiving a charging request including desired voltage information and desired current information from the wireless charging receiver, requesting the charger to output a voltage and a current respectively corresponding to the desired voltage information and the desired current information.

2. The method according to claim 1, wherein determining the acknowledgment information corresponding to the fast wireless charge identification information according to the voltage and current capability information of the charger comprising:

demodulating, in response to fast wireless charge identification information received from the wireless charging receiver, the fast wireless charge identification information;

determining, when the fast wireless charge identification information is correctly demodulated and the charger satisfies a requirement of fast wireless charging according to the voltage and current capability information of the charger, the acknowledgment information corresponding to the fast wireless charge identification information as fast wireless charge acknowledgment information; and determining, when the fast wireless charge identification information is correctly demodulated and the charger does not satisfy the requirement of fast wireless charging according to the voltage and current capability information of the charger, the acknowledgment information corresponding to the fast wireless charge identification information as normal wireless charge acknowledgment information.

3. The method according to claim 1, further comprising:
requesting a first voltage from the charger after acquiring the voltage and current capability information of the charger.

4. A method for wireless charging, the method being applied to a power management apparatus, comprising:
sending, in response to a wireless charging transmitter detecting a first voltage input after the wireless charging transmitter acquires voltage and current capability information of a charger, fast wireless charge identification information to a wireless charging receiver;

determining a charging request based on acknowledgment information received from the wireless charging receiver and sent by the wireless charging transmitter, wherein the acknowledgment information is generated by the wireless charging receiver in response to the fast wireless charge identification information;

sending, from the power management apparatus, the charging request to the wireless charging receiver; and setting an input current of the power management apparatus according to the charging request and a charging efficiency.

5. The method according to claim 4, determining a charging request based on acknowledgment information received from the wireless charging receiver comprising:
determining the charging request based on the acknowledgment information received from the wireless charging receiver if the acknowledgment information is received within a first time period after sending the fast wireless charge identification information.

6. The method according to claim 5, wherein the determining the charging request based on the acknowledgment information comprises:
determining, when the acknowledgment information is fast wireless charge acknowledgment information, the charging request as a fast wireless charging request; and determining, when the acknowledgment information is normal wireless charge acknowledgment information, the charging request as a normal wireless charging request.

7. The method according to claim 5, further comprising:
determining the charging request as a normal wireless charging request when the acknowledgment information is not received within a first time period after sending the fast wireless charge identification information.

8. The method according to claim 6, further comprising:
determining the charging request as a normal wireless charging request when the acknowledgment information is not received within a first time period after sending the fast wireless charge identification information.

9. A wireless charging system comprising a wireless charging transmitter, the wireless charging transmitter comprising:
a processor; and
a memory for storing instructions executable by the processor,
wherein the processor is configured to:
when detecting that a connection is established between the wireless charging transmitter and a charger, instruct the wireless charging transmitter to acquire voltage and current capability information of the charger;

when receiving fast wireless charge identification information from a wireless charging receiver, determine acknowledgment information corresponding to the fast wireless charge identification information according to the voltage and current capability information of the charger;

instruct the wireless charging transmitter to send the acknowledgment information to the wireless charging receiver; and when receiving a charging request from the wireless charging receiver in response to the acknowledgment information, request the charger for a voltage and a current corresponding to the charging request.

10. The wireless charging system according to claim 9, wherein the processor is further configured to:
in response to fast wireless charge identification information received from the wireless charging receiver, demodulate the fast wireless charge identification information;

when the fast wireless charge identification information is correctly demodulated and the charger satisfies a requirement of fast wireless charging according to the voltage and current capability information of the charger, determine the acknowledgment information corresponding to the fast wireless charge identification information as fast wireless charge acknowledgment information; and when the fast wireless charge identification information is correctly demodulated and the charger does not satisfy the requirement of fast wireless charging according to the voltage and current capability information of the charger, determine the acknowledgment information corresponding to the fast wireless charge identification information as normal wireless charge acknowledgment information.

11. The wireless charging system according to claim 9, wherein the processor is further configured to:
request a first voltage from the charger.

12. The wireless charging system according to claim 9, further comprising a power management apparatus, the power management apparatus comprising:
a management processor; and
a management memory for storing instructions executable by the management processor,
wherein the management processor is configured to:
in response to detecting a first voltage input, send fast wireless charge identification information to the wireless charging receiver;

determine a charging request based on acknowledgment information received from the wireless charging receiver, wherein the acknowledgment information is generated by the wireless charging receiver in response to the fast wireless charge identification information;

send the charging request to the wireless charging receiver; and set an input current of the power management apparatus according to the charging request and a charging efficiency.

13. The wireless charging system according to claim 12, wherein the management processor is further configured to:

determine the charging request based on the acknowledgment information received from the wireless charging receiver if the acknowledgment information is received within a first time period after sending the fast wireless charge identification information.

14. The wireless charging system according to claim 13, wherein the management processor is further configured to:

when the acknowledgment information is fast wireless charge acknowledgment information, determine the charging request as a fast wireless charging request; and when the acknowledgment information is normal wireless charge acknowledgment information, determine the charging request as a normal wireless charging request.

15. The wireless charging system according to claim 13, wherein the management processor is further configured to:

determine the charging request as a normal wireless charging request when the acknowledgment information is not received within a first time period after sending the fast wireless charge identification information.

16. The wireless charging system according to claim 14, wherein the management processor is further configured to:

determine the charging request as a normal wireless charging request when the acknowledgment information is not received within a first time period after sending the fast wireless charge identification information.

* * * * *